US005649014A

United States Patent [19]
Koopman, Jr. et al.

[11] Patent Number: 5,649,014
[45] Date of Patent: Jul. 15, 1997

[54] PSEUDORANDOM COMPOSITION-BASED CRYPTOGRAPHIC AUTHENTICATION PROCESS

[75] Inventors: Philip J. Koopman, Jr., Hebron; Alan M. Finn, Amston; Robert E. LaBarre, Willington, all of Conn.

[73] Assignee: United Technologies Automotive, Inc., Dearborn, Mich.

[21] Appl. No.: 537,487

[22] Filed: Oct. 2, 1995

Related U.S. Application Data

[62] Division of Ser. No. 294,147, Aug. 22, 1994.

[51] Int. Cl.$^6$ .................................................. H04K 1/00
[52] U.S. Cl. ............................. 380/28; 380/4; 380/23; 380/42; 380/44
[58] Field of Search ................................ 380/3, 4, 23, 24, 380/25, 28, 42, 44

[56] References Cited

U.S. PATENT DOCUMENTS

| | | | |
|---|---|---|---|
| 4,736,419 | 4/1988 | Roe | 380/3 |
| 4,853,962 | 8/1989 | Brockman | 380/44 |
| 5,179,592 | 1/1993 | Kusano | 380/28 |
| 5,222,141 | 6/1993 | Killian | 380/42 |

*Primary Examiner*—David C. Cain

[57] ABSTRACT

The pseudorandom process iteratively applies a selected CRC encryption process on the information to be encrypted. The encryption process is selected by testing one of the digits comprising the number to be encrypted. A first encryption process is used if the tested digit is a 1; a second encryption process is used if the tested digit is a 0. The process is repeated a plurality of times, e.g. once for each digit in the number to be encrypted, resulting in a highly encrypted value that is not easily reverse engineered by chosen or known plaintext attack.

26 Claims, 4 Drawing Sheets

PSEUDORANDOM COMPOSITION-BASED CRYPTOGRAPHIC AUTHENTICATION PROCESS

This is a division of copending application Ser. No. 08/294,147 filed on Aug. 22, 1994 currently pending.

BACKGROUND AND SUMMARY OF THE INVENTION

The present invention relates generally to cryptography, and in particular to a method of encrypting digital information rendering it more difficult to decipher using computer-assisted techniques. Although the invention is applicable to a wide range of applications, it finds particular utility in an encryption system for keyless entry locks, such as keyless entry locks for automotive applications.

Cyclic redundancy code (CRC) cryptographic authentication processes are currently employed in anti theft systems for vehicles, including keyless entry systems and engine ignition systems. User authentication is a major concern. Present-day systems use RF or infrared transmissions to communicate between the vehicle and the wireless electronic key device, commonly embedded in a key fob. These systems suffer from "playback" attacks, where a would-be thief simply records the transmission of the key Fob and plays it back to gain entry. Cryptographic authentication systems are used to provide some degree of security against such playback attacks.

While cyclic redundancy code cryptographic authentication systems provide a modicum of security, these systems can be broken by computer-assisted techniques. One such technique is the "chosen plaintext" attack, in which a computer generates a sequence of possible access codes and monitors the response of the key fob or lock to each sequence sent. Because computers can do this quite quickly, it is possible using the chosen plaintext attack to rapidly sequence through millions of selectively chosen combinations, until the unlocking combination is found. The chosen plaintext attack works well on conventional cryptographic systems because the attacker knows the identity of each input number tested and simply has to observe the system response to that input. After enough observations are made, the internal workings of the secret cryptographic process can be inferred.

The present invention provides a unique pseudorandom process for immunizing a cryptographic system against chosen plaintext attack. The digital information to be encrypted is represented as a set of binary digits. The set of binary digits is then altered by sequentially testing each of a plurality of digits, one digit at a time, to determine if the digit is a 1 or a 0. For each digit so tested, a first encryption process is applied to the set of digits if the tested digit is a 1, and second encryption process is applied to the set of digits if the tested digit is a 0. The power of this technique may be seen by considering what happens when an n-bit number is encrypted. Because each bit may be tested an encryption process selected accordingly, there are $2^n$ possible encryption processes. The encryption process is therefore data dependent, making chosen plaintext attack exponentially less fruitful.

For a more complete understanding of the invention, its objects and advantages, reference may be had to the following specification and to the accompanying drawings.

DESCRIPTION OF THE PREFERRED EMBODIMENT

The invention will be described in the context of a keyless entry system for a vehicle. Accordingly, in FIG. 1 a car is diagrammatically depicted by dashed box 10 and a remote keyless entry key fob device is similarly depicted at 12. In the illustrated scenario, the car transmits digital information x to fob 12 and fob 12 transmits digital information $Y_{fob}$ to the car 10. In a typical keyless entry system the two digital information signals are sent using infrared or radio frequency signals. Because these signals are sent via a wireless pathway, they are potentially subject to reception by would-be code breakers. Accordingly, one important aspect of the invention is the encrypting of these signals so that they may not be readily decrypted and used to steal the car.

Figure 1:
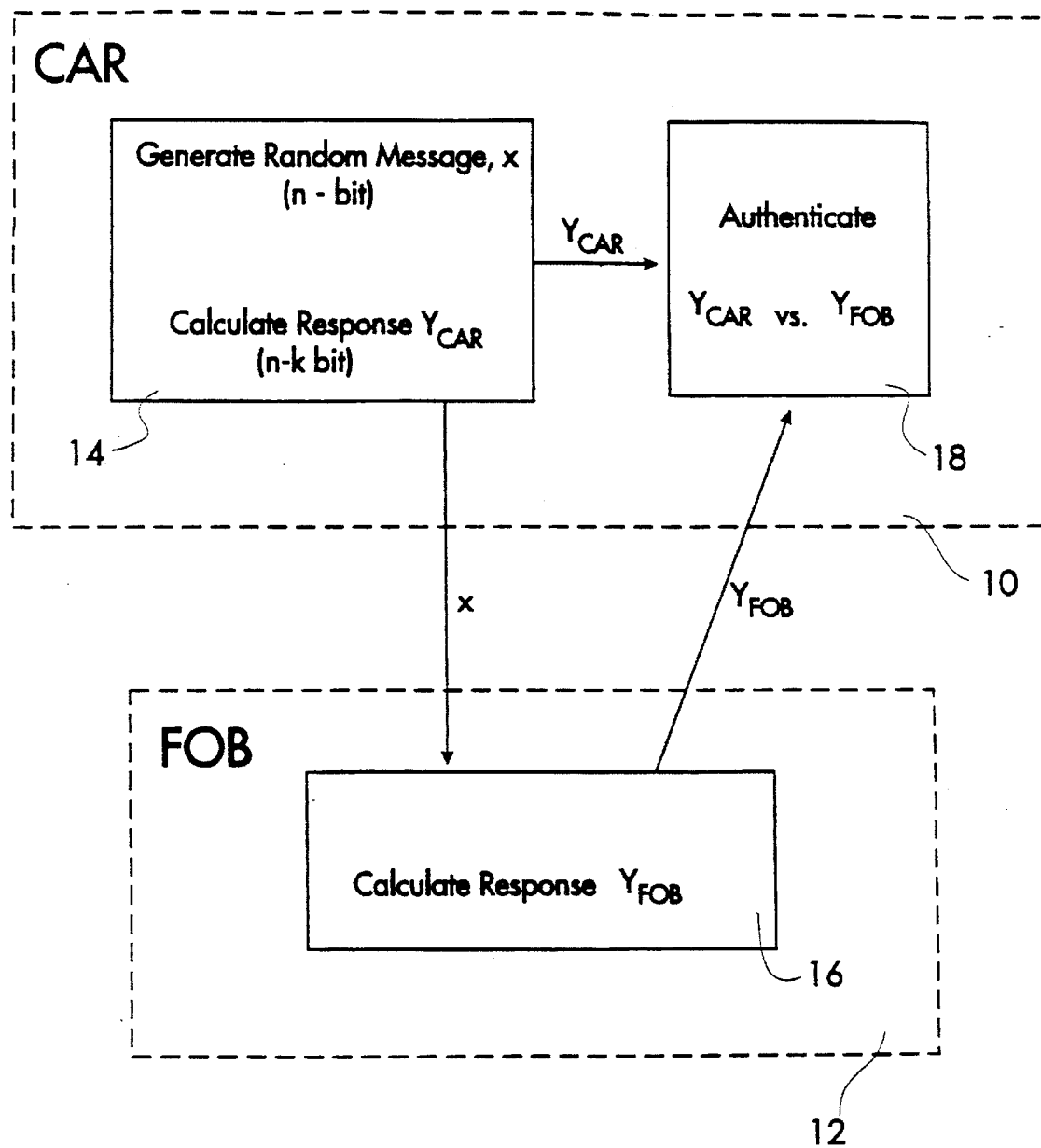
FIG. 1 is a block diagram illustrating an exemplary authentication interaction between car and Fob, useful in explaining the invention.

Digital information message x is generated as a random n-bit number. For example, the random number may be generated using a random number generator which relies on thermal noise or on cosmic background radiation, for example. Both the car and the fob both employ the same mechanism to calculate an encrypted digital information signal Y, which may be an n-bit number or alternatively an n-bit number with certain digits masked off (n–k bits). In FIG. 1 the mechanism used by the car to generate the encrypted digital information $Y_{car}$ is illustrated as the lower portion of block 14. The counterpart mechanism in the fob is depicted by block 16, which produces the encrypted digital value $Y_{fob}$. The details of this encryption mechanism are described in connection with FIGS. 2 and 3 below.

The car 10 also includes an authentication block 18 which compares the encrypted information $Y_{car}$ with the encrypted digital information $Y_{fob}$. If these two values match, the interrogation sequence will deem the entry attempt to be authentic and the lock is unlocked. If these values do not match, then the interrogation sequence fails and the lock remains locked.

Before turning to the details of the encryption routine, it is instructive to note that the digital information transmitted from car to fob is a random number. The digital information returned by the fob to the car is an encrypted random number. Hence the would-be thief gains virtually no information by monitoring either of these transmissions.

Figure 2:
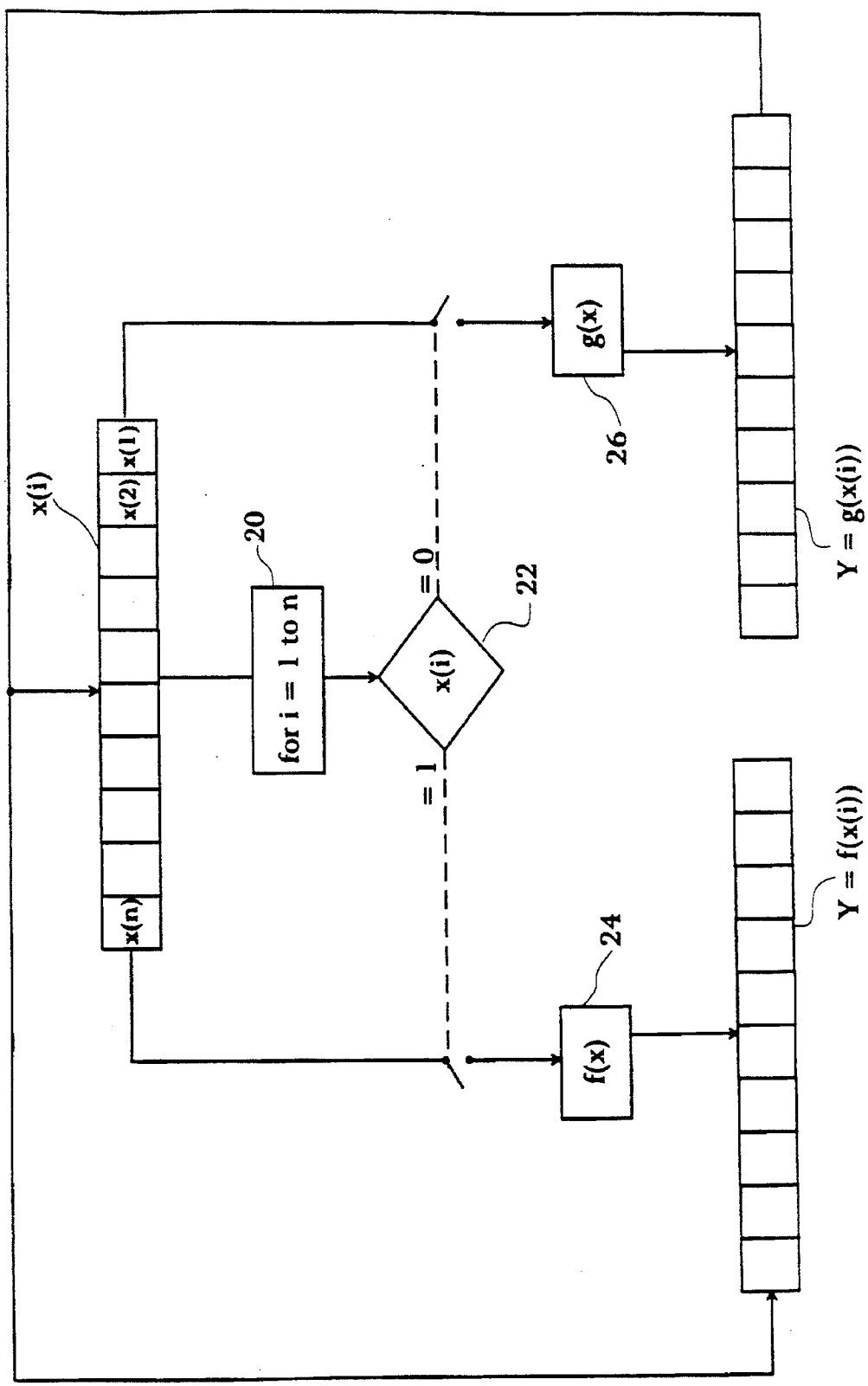
FIG. 2 is a flow diagram illustrating the pseudorandom bitwise encryption technique of the invention.

Referring to FIG. 2, the presently preferred pseudorandom encryption process is introduced. Specifically, FIG. 2 details the bitwise encryption technique whereby the digital information is altered in a different way depending on whether each digit is a 1 or a 0. Thereafter, in FIG. 3, the presently preferred pseudorandom encryption scheme is illustrated in detail.

Referring to FIG. 2, the digital information to be encrypted is represented as a set of binary digits, in this case binary digits x(1) . . . x(10). For purposes of this example, a 10 bit number has been used. Of course, in practice the number may be any number of bits. Each of the individual binary digits or bits has been illustrated separately by boxes designated x(0) . . . x(1) . . . x(10). A looping construct 20 is used which tests, one after another, each successive bit of the digital information N(i). This looping mechanism is designated at 20. With each pass through the loop, the individual digit represented by the index counter i is tested to see whether it is a 1 or a 0. If the digit is a 1, encryption process f(x) is used, as depicted at 24. If the digit is a 0, encryption process g(x) is used as depicted at 26.

Processes f(x) and g(x) operate on the entire set of binary digits representing x. The resultant value Y, whether generated using f(x) or g(x), is fed back to and substituted for the original value x, whereupon the next iteration of the loop continues in the same fashion. In this way, the original digital information value x will be encrypted through a series of n encryption processes, with each individual process being either f(x) or g(x), depending on the digital value of the bit pointed to by the current index counter i. A pseudorandom, data-dependent composition process results. In the case of the 10 bit number illustrated in this example, this process results in $2^{10}=1024$ different encryption processes.

Figure 3:
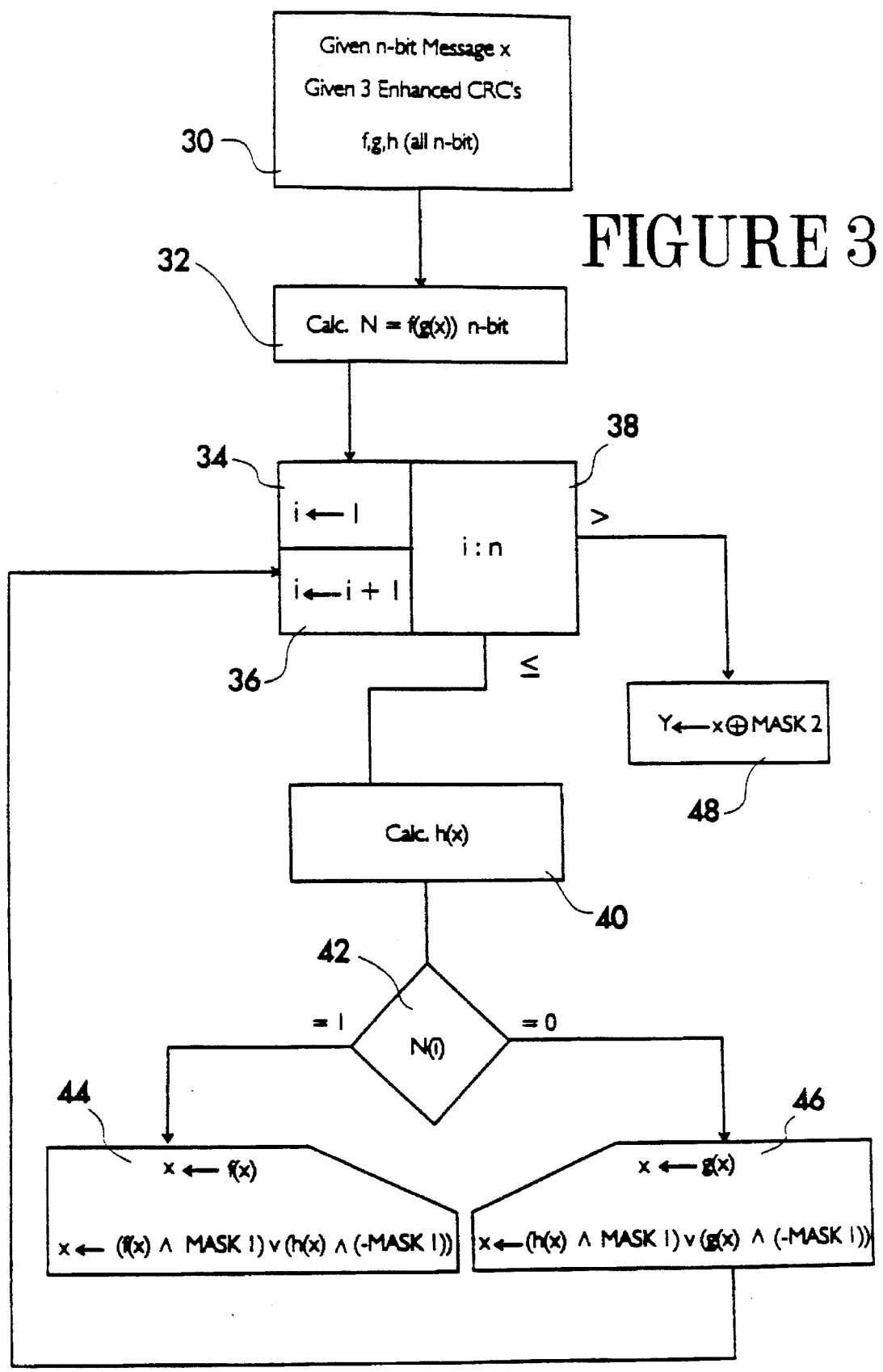
FIG. 3 is a flowchart illustrating a presently preferred embodiment of the invention.

In FIG. 3 a presently preferred encryption process, using the technique of FIG. 2, is illustrated. The digital information to be encrypted is represented as an n-bit message X, as depicted at block 30. Block 30 also illustrated that the presently preferred encryption process uses three enhanced cyclic redundancy code processes, designated as functions f, g and h, all n-bit processes. The details of these enhanced cyclic redundancy code processes are explained in FIGS. 4 and 5. While these processes are presently preferred, it will be understood that other encryption processes may be used instead.

In step 32 the encrypted value n is calculated using two of the three provided functions, namely f and g. Step 32 is a composition process. That is, the result of one function is used as the input to the next function. Thus, in this case, the CRC process g is applied to message x and the result is then fed as input to CRC function f. The resulting value N thus represents a composition-based encryption of message x.

Next, control proceeds to the looping construct depicted by boxes 34, 36 and 38. Essentially the looping construct uses an index counter i which is first assigned the value 1 in step 34. The index counter is compared to N in step 38 to determine the end of looping. Subsequently, the looping construct increments the index counter i by assigning it the value i+1 as indicated in step 36. The looping construct continues in this fashion until the index counter i=n (the number of bits in the n-bit message x and in the encrypted n-bit value n). The presently preferred looping construct tests the index counter value at step 38 before proceeding to step 40 or to step 48. If the index counter i is ≦n, control proceeds to step 40. Otherwise, if index counter i is ≧n, control proceeds to step 48.

In step 40 the third enhanced CRC function h is used upon message x. This will result in an encrypted value having n bits or digits. This value is used later in the encryption process, as will be illustrated.

At step 42 each digit of the encrypted digital information N is tested to determine if the digit is a 1 or a 0. One digit of value N is tested on each pass through the looping construct. Thus, the first time through the loop the digit N(1) is tested; the second pass through the loop N(2) is tested, and so forth. If the digit tested is a 1, control branches to step 44. If the digit tested is a 0, control branches to step 46.

Steps 44 and 46 are different in that they used different encryption processes. Step 44 uses CRC process f, whereas step 46 uses CRC process g. The control flow through each branch is essentially the same. Taking step 44, for example, the value x is replaced with the encrypted value f(x). This value is then concatenated with a portion of the encrypted value h(x). Note that h(x) is calculated at step 40 and note that this calculation occurs anew with each iteration of the loop. The presently preferred concatenation involves applying a mask (mask 1) to values f(x), g(x) and h(x). The mask is applied by Boolean AND operation. The resulting masked values are then combined using a Boolean OR operation and the value x is replaced by the result of this OR operation. Any mask can be used as mask 1. For example, mask i can be a predefined bit pattern, e.g., 0101101010. Alternatively, the mask can be generated by a process. For example, the m high order bits of f(x) may be concatenated with n−m low order bits of h(x), or the l high order bits of h(x) may be concatenated with the n−l low order bits of g(x), depending on whether f(x) or g(x) was used in the loop index (i.e., whether control has branched to step 44 or step 46.

Once all n loop iterations have been completed, the result Y is generated at step 48. Y may be simply the value x after the above-described encryption process. Alternatively, a second mask (mask 2) may be applied to the value x and this new masked value is used as Y. This is illustrated in step 48 where mask 2 is applied to value x using an exclusive OR operation.

Once all n loop iterations have been completed, the resulting Y is transmitted back to the car for authentication. Since the car has the same shared secret information as the fob, the car performs the same operations on the original message x that is sent to the Fob. Authentication amounts to confirming the message received from the fob (Y) matches that produced by the car.

The above-described pseudorandom technique may be implemented using a variety of different encryption processes. In the presently preferred embodiment three processes f, g and h are used. By way of example, the following will now describe a suitable cyclic redundancy code (CRC) process which may be used to implement the invention. The process illustrated here is an enhanced cyclic redundancy code process which has increased resistance to attack by virtue of the non-Galois field operation that is secretly performed at a point in the encryption process known only to the car and to the fob. Of course, the foregoing pseudorandom cryptographic process can be used with other types of encryption processes.

The presently preferred encryption method uses a cyclic redundancy code (CRC) to scramble the bits of a message of digital information. Conventional CRC processes provide comparatively weak encryption. This is because a CRC process can be expressed as a linear operation over a Galois Field, and linear operations are inherently easier to analyze than nonlinear operations. The enhanced CRC process introduces nonlinearities into the CRC process by performing an operation over the Real Field or Integer Ring, in the middle of the CRC process.

As used herein the terms Real Field and Integer Ring are used essentially synonymously. As will be explained, this technique introduces significant complexity, making cryptographic analysis far more difficult. The inclusion of an Integer Ring operation, such as Integer Ring addition, superimposes a supplemental encryption function over and above the basic CRC process. This, in effect, gives two simultaneous levels of encryption or scrambling, essentially for the price of one.

The enhanced CRC process can be implemented to operate on digital information comprising any desired number of bits. For example, in a keyless entry system a 32 bit CRC process (with a secret feedback polynomial) may be used to scramble a 32 bit piece of digital information such as an access code. The CRC process is equivalent to multiplication in a Galois Field $GF(2^n)$. The CRC can be computed as 32 iterations of a shift and exclusive OR with mask operation.

Figure 4:
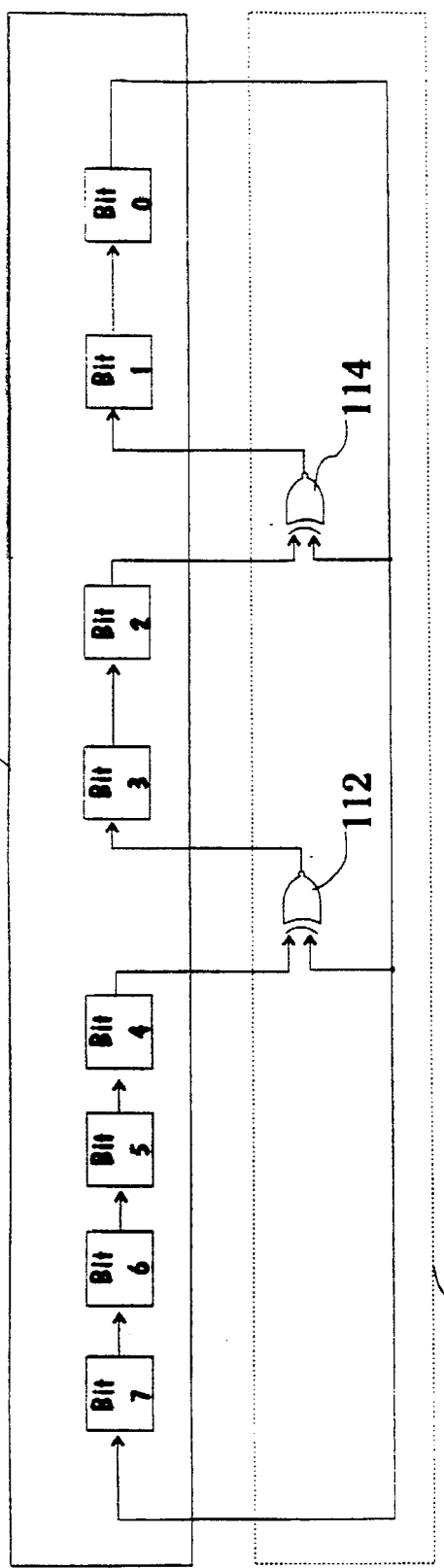
FIG. 4 is a block diagram illustrating an example of a linear feedback shift register (LFSR), useful in understand the principles of the invention.

To illustrate the principle, an 8 bit CRC process will be illustrated. It will, of course, be understood that the invention is not restricted to any bit size number. Referring to FIG. 4, the individual bits residing in register 110 have been designated in the boxes labeled bit 0-bit 7 consecutively. In general, register 110 is configured to cycle from left to right so that bit 7 shifts right to supply the input to bit 6, bit 6 to bit 5, and so forth (with the exception of those bits involved in the exclusive OR operations). As illustrated, bit 0 shifts back to bit 7, thereby forming a cycle or loop.

In addition to the shift operation, the digital information in register 110 is also subjected to one or more exclusive OR operations. In FIG. 4, exclusive OR operations 112 and 114 have been illustrated. Exclusive OR operation 112 receives one of its inputs from bit 4 and the other of its inputs from bit 0. Exclusive OR 112 provides its output to bit 3. Similarly, exclusive OR 114 receives its inputs from bit 2 and bit 0 and provides its output to bit 1. The two exclusive OR operations illustrated in FIG. 4 are intended to be merely exemplary, since, in general, any number of exclusive OR operations may be used, ranging from none up to the number of digits in the register (in this case 8). Also, the exclusive OR operations may be positioned between any two adjacent bits, in any combination. Thus, the positioning of exclusive OR operations between bits 3 and 4 and between bits 1 and 2 as shown in FIG. 4 is merely an example.

The exclusive OR operations selected for a given encryption may be viewed as a mask wherein the bits of the mask are designated either 1 or 0, depending on whether an exclusive OR operation is present or not present. Thus, in FIG. 4, the mask may be designated generally at 116.

Table I illustrates the shift register bit patterns for the register and mask combination of FIG. 4. The Table lists at the top an exemplary initial bit pattern (to represent an exemplary byte or word of digital information), followed by the resulting bit patterns for each of 8 successive iterations or cycles.

Table I depicts all of the possible successive bit patterns for the circuit of FIG. 4. Because the exclusive OR gates of FIG. 4 do not correspond to a primitive polynomial, the circuit is not a maximal length feedback shift register. That it is not maximal length is obvious by inspection of Table I. Each separate column of binary numbers represents successive steps of the circuit of FIG. 4. A shift of the last number in a column (equivalently a cycle) produces the number at the top of the column. There are 20 different cycles of length between 2 and 14.

TABLE I

| | | | | | | |
|---|---|---|---|---|---|---|
| 00000001 | 00000011 | 00000101 | 00000111 | 00001001 | 00001011 | 00001101 |
| 10001010 | 10001011 | 10001000 | 10001001 | 10001110 | 10001111 | 10001100 |
| 01000101 | 11001111 | 01000100 | 11001110 | 01000111 | 11001101 | 01000110 |
| 10101000 | 11101101 | 00100010 | 01100111 | 10101001 | 11101100 | 00100011 |
| 01010100 | 11111100 | 00010001 | 10111001 | 11011110 | 01110110 | 10011011 |
| 00101010 | 01111110 | 10000010 | 11010110 | 01101111 | 00111011 | 11000111 |
| 00010101 | 00111111 | 01000001 | 01101011 | 10111101 | 10010111 | 11101001 |
| 10000000 | 10010101 | 10101010 | 10111111 | 11010100 | 11000001 | 11111110 |
| 01000000 | 11000000 | 01010101 | 11010101 | 01101010 | 11101010 | 01111111 |
| 00100000 | 01100000 | 10100000 | 11100000 | 00110101 | 01110101 | 10110101 |
| 00010000 | 00110000 | 01010000 | 01110000 | 10010000 | 10110000 | 11010000 |
| 00001000 | 00011000 | 00101000 | 00111000 | 01001000 | 01011000 | 01101000 |
| 00000100 | 00001100 | 00010100 | 00011100 | 00100100 | 00101100 | 00110100 |
| 00000010 | 00000110 | 00001010 | 00001110 | 00010010 | 00010110 | 00011010 |
| 00001111 | 00010011 | 00010111 | 00011001 | 00011011 | 00011101 | 00100111 |
| 10001101 | 10000011 | 10000001 | 10000110 | 10000111 | 10000100 | 10011001 |
| 11001100 | 11001011 | 11001010 | 01000011 | 11001001 | 01000010 | 11000110 |
| 01100110 | 11101111 | 01100101 | 10101011 | 11101110 | 00100001 | 01100011 |
| 00110011 | 11111101 | 10111000 | 11011111 | 01110111 | 10011010 | 10111011 |
| 10010011 | 11110100 | 01011100 | 11100101 | 10110001 | 01001101 | 11010111 |
| 11000011 | 01111010 | 00101110 | 11111000 | 11010010 | 10101100 | 11100001 |
| 11101011 | 00111101 | | 01111100 | 01101001 | 01010110 | 11111010 |
| 11111111 | 10010100 | | 00111110 | 10111110 | 00101011 | 01111101 |
| 11110101 | 01001010 | | 00011111 | 01011111 | 10011111 | 10110100 |
| 11110000 | 00100101 | | 10000101 | 10100101 | 11000101 | 01011010 |
| 01111000 | 10011000 | | 11001000 | 11011000 | 11101000 | 00101101 |
| 00111100 | 01001100 | | 01101100 | 01101100 | 01110100 | 10011100 |
| 00011110 | 00100110 | | 00110010 | 00110110 | 00111010 | 01001110 |
| 00101001 | 00101111 | 00111001 | 01010001 | 01010011 | 01011011 | |
| 10011110 | 10011101 | 10010110 | 10100010 | 10100011 | 10100111 | |
| 01001111 | 11000100 | 01001011 | | 11011011 | 11011001 | |
| 10101101 | 01100010 | 10101111 | | 11100111 | 11100110 | |
| 11011100 | 00110001 | 11011101 | | 11111001 | 01110011 | |
| 01101110 | 10010010 | 11100100 | | 11110110 | 10110011 | |
| 00110111 | 01001001 | 01110010 | | 01111011 | 11010011 | |
| 10010001 | 10101110 | | | 10110111 | 11100011 | |
| 11000010 | 01010111 | | | 11010001 | 11111011 | |
| 01100001 | 10100001 | | | 11100010 | 11110111 | |
| 10111010 | 11011010 | | | 01110001 | 11110001 | |
| 01011101 | 01101101 | | | 10110010 | 11110010 | |
| 10100100 | 10111100 | | | 01011001 | 01111001 | |
| 01010010 | 01011110 | | | 10100110 | 10110110 | |

The bitwise shifting and exclusive OR operations provided by the CRC process can be viewed as a multiplication operation between the register and mask in the Galois Field $GF(2^n)$. This operation is, in effect, a convolution operation in which the register bit pattern representing the digital information to be encrypted is convolved with or folded into the bit pattern of the mask.

Figure 5:
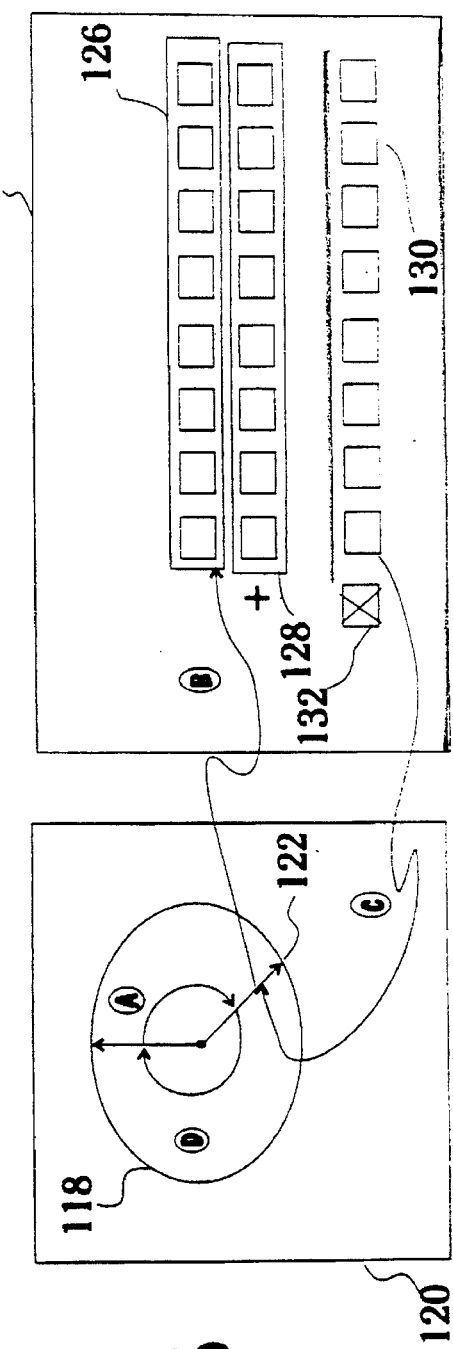
FIG. 5 is a schematic diagram illustrating the method by which digital information is encyrpted utilizing processing steps in both the Galois Field and the Integer Ring.

Rather than performing the shifting and exclusive OR operations through a full cycle, as demonstrated by Table I, the present invention suspends or temporarily halts the convolution operation after a predetermined number of multiplications or iterations. The number of iterations performed before the CRC convolution process is suspended can be treated as a secret number or key to be used in later decrypting the resultant. In FIG. 5 the CRC convolution process is illustrated diagrammatically by circle 118. For illustration purposes, one complete cycle of n iterations (n being the number of bits in the register in this example is diagrammatically depicted by a full rotation of 360° within circle 118. Thus during a first portion of the convolution process depicted by arc A the CRC process proceeds from its starting point at the twelve o'clock position to the suspension point (in this case at the five o'clock position). The point at which suspension occurs is arbitrary, since suspension can occur at any selected point within the full convolution cycle.

While the convolution process is occurring, as depicted by circle 118, the operations can be considered as taking place in or being represented in the Galois Field, designated generally by region 120. However, when the suspension point is reached, as at 122, the Galois Field processes are suspended and further processing occurs in the Integer Ring 124. While in the Integer Ring the intermediate resultant of previous Galois Field operations (multiplications) are operated on by a Real Field or Integer Ring process. In FIG. 5, the intermediate resultant value is depicted generally by bit pattern 126. In the presently preferred embodiment bit pattern 126 is arithmetically added with a predetermined number or bit pattern 128, with the resulting sum depicted at 130.

One characteristic of the Integer Ring operation is that a carry operation may or may not occur, depending on the value of the digits being added. That is, if digits 0+0 are added, no carry occurs, whereas if digits 1+1 are added, a carry is generated. Any carry from the most significant digit is ignored, as illustrated at 132.

After the Integer Ring operation has completed, the resultant sum is transferred back to the Galois Field as indicated by arrow C, whereupon the remainder of the CRC operation is carried out as indicated by arc D.

It will be appreciated that the options for altering the simple CRC process are numerous. The precise point at which the CRC process is suspended and the resultant transferred to the Integer Ring can be after any preselected number of iterations (the preselected number being optionally a secret number or key). In addition, the number or bit pattern 128 added while in the Real Field or Integer Ring can also be any secret number, serving as an additional key. Because carries may occur between bits of the intermediate value during the addition step in the Integer Ring, the process is nonlinear with respect to the Galois Field over which the CRC process is being performed. It will be seen that the process thus described is extremely inexpensive to implement, since it only requires one or a few additional program instructions to accomplish and may be effected in as short as a single clock cycle.

The improved encryption resulting from the above-described process may be used as a new fundamental cryptographic building block which can be combined to form a part of a more complex encryption/decryption process. For example, more than one Integer Ring operation could be performed during the CRC process to further complicate any decryption analysis. Similarly, any single or combination of information-preserving, reversible operations over the Integer Ring (e.g. addition, subtraction) can be used during the CRC. The key to effectiveness is that the Integer Ring operation must produce the possibility of inter-bit arithmetic carries, which are inherently poorly expressed by Galois Field analysis. Similarly any combination of two or more information-preserving, reversible operations over different mathematical structures, such as Groups, Rings or Fields, can be used. The key to effectiveness is that the operation in one mathemtaical structure is inherently poorly represented in one or more of the other structures.

The enhanced CRC process may be implemented in software.

From the foregoing it will be understood that the invention provides an easily implemented, but highly effective technique for encrypting digital information so that chosen plaintext attack cannot be readily used to decrypt the information. While the invention has been described in its presently preferred form, it will be understood that the invention is capable of modification without departing from the spirit of the invention as set forth in the appended claims.

What is claimed is:

1. A method of encrypting digital information comprising:
   representing said digital information as a set of binary digits, N;
   (a) testing one of the binary digits to determine if the digit is a 1 or a 0;
   (b) applying a first encryption process on said digital information if the digit is a 1 to produce an altered set of digital information;
   (c) applying a second encryption process on said digital information if the digit is a 0 to produce an altered set of digital information;
   (d) replacing said digital information with said altered set of digital information;
   (e) repeating steps (a) through (d), testing a different one of said binary digits in performing step (a).

2. The method of claim 1 wherein said first encryption process is an enhanced CRC process.

3. The method of claim 1 wherein said second encryption process is an enhanced CRC process.

4. The method of claim 1 further comprising performing a third encryption process on said set of binary digits prior to said step of testing the binary digits.

5. The method of claim 1 wherein step (e) is performed iteratively over each digit in said set of digits.

6. The method of claim 1 wherein a plurality of binary digits are tested in step (a).

7. A system for encrypting digital information, the digital information comprising at least a first and a second binary digit, the system comprising:
   means for determining whether said first binary digit is a logic 1 or a logic 0;
   means for encrypting the digital information according to a first encryption process if said first binary digit is a logic 1 or a second encryption process if said first binary digit is a logic 0 to produce an altered set of digital information; and means for replacing said digital information with said altered set of digital information.

8. The system of claim 7, further comprising:
means for determining whether said second binary digit is a logic 1 or a logic 0;
means for encrypting said altered set of digital information according to a third encryption process if said second binary digit is a logic 1 or a fourth encryption process if said second binary digit is a logic 0 to produce a second altered set of digital information; and
means for replacing said altered set of digital information with said second altered set of digital information.

9. The system of claim 8, wherein said first or said second or said third or said fourth encryption process comprises an enhanced CRC process.

10. The system of claim 7, further comprising: means for performing a fifth encryption process on the first and second binary digits to encrypt and input the digital information to said means for determining whether said first binary digit is a logic 1 or a logic 0.

11. The system of claim 8, further comprising: means for performing a sixth encryption process on the first and second binary digits to encrypt and input said altered set of digital information to said means for determining whether said second binary digit is a logic 1 or a logic 0.

12. The system of claim 8, wherein the digital information further comprises a third binary digit, and further comprising:
means for determining whether said third binary digit is a logic 1 or a logic 0;
means for encrypting said second altered set of digital information according to a seventh encryption process if said third binary digit is a logic 1 or an eighth encryption process if said third binary digit is a logic 0 to produce a third altered set of digital information; and
means for replacing said second altered set of digital information with said third altered set of digital information.

13. The system of claim 12, wherein said seventh or said eighth encryption process comprises an enhanced CRC process.

14. The system of claim 8, wherein said means for determining whether said first binary digit is a logic 1 or a logic 0, said means for determining whether said second binary digit is a logic 1 or a logic 0, and said means for determining whether said third binary digit is a logic 1 or a logic 0 are realized by a single means for determining device.

15. The system of claim 7, further comprising:
means for authenticating said altered set of digital information; and
means for performing a security function if said altered set of digital information authentication is valid.

16. A system for encrypting digital information, the digital information comprising at least a first and a second binary digit, the system comprising:
a digital tester for testing whether said first binary digit is a logic 1 or a logic 0;
an encryptor for encrypting the digital information according to a first encryption method if said first binary digit is a logic 1 or according to a second encryption method if said first binary digit is a logic 0 to produce an altered set of digital information; and
a replacing device for replacing said digital information with said altered set of digital information.

17. The system of claim 16, further comprising:
a second digital tester for determining whether said second binary digit is a logic 1 or a logic 0;
a second encryptor for encrypting said altered set of digital information according to a third encryption process if said second binary digit is a logic 1 or according to a fourth encryption process if said second binary digit is a logic 0 to produce a second altered set of digital information; and
a second replacing device for replacing said altered set of digital information with said second altered set of digital information.

18. The system of claim 17, wherein said first and second digital tester are realized by a singular device, said first and second encryptor are realized by a singular device, and said first and second repeater are realized by a singular device.

19. The system of claim 17, wherein said first or said second or said third or said fourth encryption process comprises an enhanced CRC process.

20. The system of claim 16, further comprising:
a third encryptor for encrypting said at least a first and a second binary digit according to encrypt and input the digital information to said digital tester for testing whether said first binary digit is a logic 1 or a logic 0.

21. The system of claim 17, further comprising: a fourth encryptor for encrypting said at least a first and a second binary digit according to encrypt and input said altered set of digital information to said second digital tester for testing whether said second binary digit is a logic 1 or a logic 0.

22. The system of claim 17, wherein the digital information further comprises a third binary digit, and further comprising:
a third digital tester for determining whether said third binary digit is a logic 1 or a logic 0;
a fifth encryptor for encrypting said second altered set of digital information according to a seventh encryption process if said third binary digit is a logic 1 or an eighth encryption process if said third binary digit is a logic 0 to produce a third altered set of digital information; and
a replacing device for replacing said second altered set of digital information with said third altered set of digital information.

23. The system of claim 22, wherein said fifth or said sixth or said seventh or said eighth encryption process comprises an enhanced CRC process.

24. The system of claim 22, wherein said digital tester for determining whether said first binary digit is a logic or a logic 0, said second digital tester for determining whether said second binary digit is a logic 1 or a logic 0, and said third tester for determining whether said third binary digit is a logic 1 or a logic 0 are realized by a singular device.

25. The system of claim 16, further comprising:
an authenticator for authenticating said altered set of digital information; and
a system for performing a security function when said altered set of digital information authentication is valid.

26. A pseudorandom composition based cryptographic authentication system for encrypting digital information represented as a number of binary digits, the pseudorandom composition based cryptographic authentication system comprising:
a selector for selecting a binary digit of the number corresponding with a counter, said counter having a value pointing to said selected binary digit of said plurality;

a comparator for comparing said counter value with the number;

a digital tester for testing whether said selected binary digit of the number is a logic 1 or a logic 0;

an encryptor for encrypting the digital information according to a first encryption method if said binary digit of said plurality is a logic 1 or according to a second encryption method if said binary digit is a logic 0 to produce an altered set of digital information;

a copying device for copying said altered set of digital information into said digital information when the number is greater than said counter value, said copying device incrementing said counter value upon copying said altered set of digital information; and a feedback loop for restarting the pseudorandom composition based cryptographic authentication system to enable each binary digit of the number to be individually processed the number of times such that said selector selects a further binary digit of the number, said comparator compares the number with said counter value, said encryptor encrypts, said copying device copies, and said counter value is incremented, until said counter value is equal to the number.

* * * * *